Patented July 13, 1937

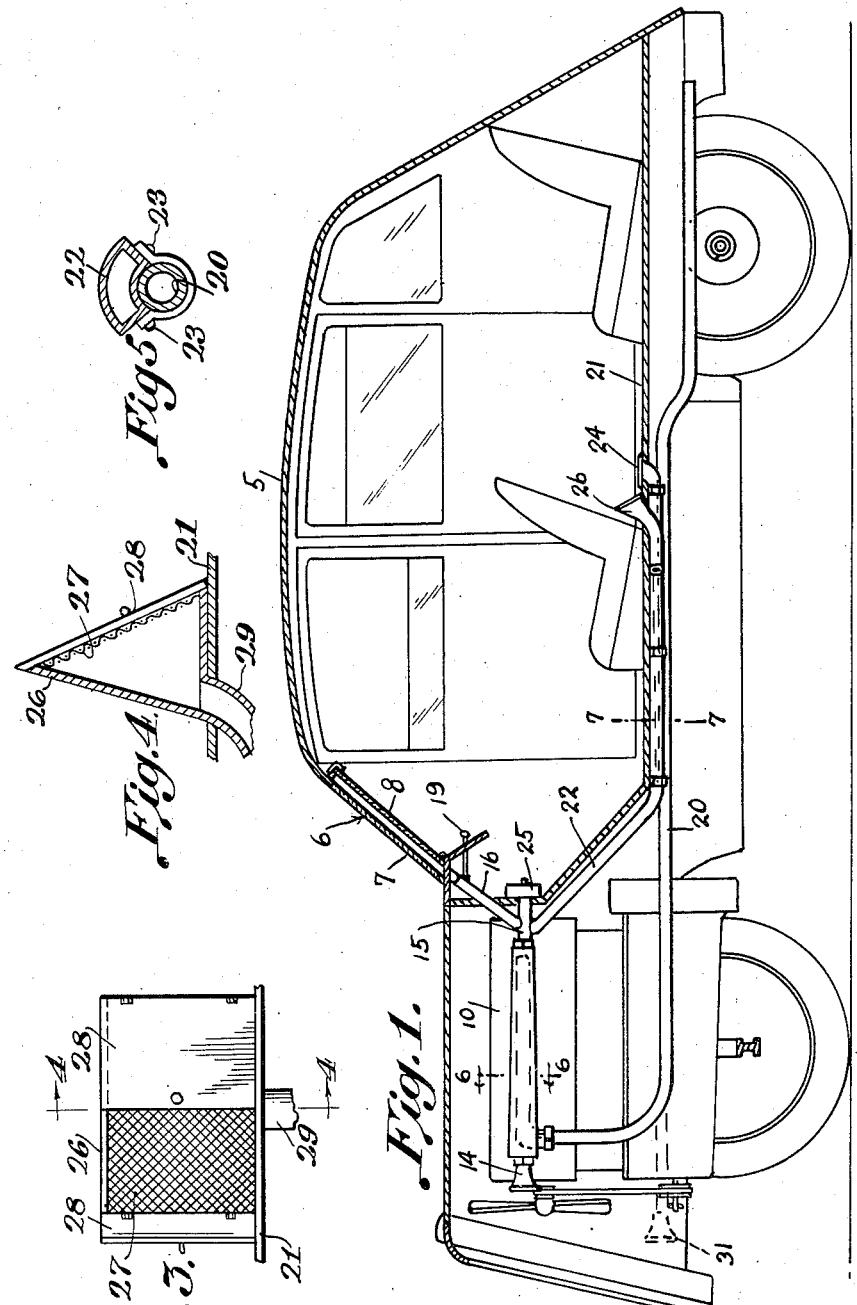

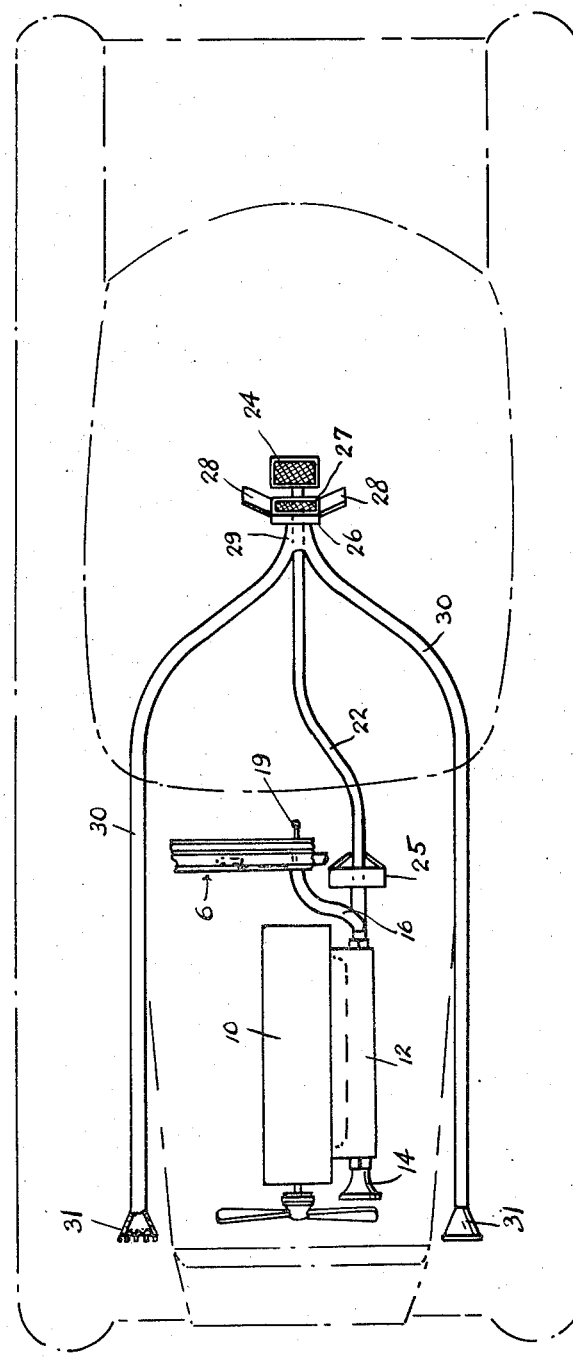

2,087,171

UNITED STATES PATENT OFFICE 2,087,171

AUTOMOBILE COOLING, HEATING, AND WINDSHIELD CONDENSATION PREVENTING SYSTEM

Joseph A. Szostek, Springfield, Mass.

Application July 16, 1935, Serial No. 31,672

1 Claim. (Cl. 98—2)

This invention appertains to new and useful improvements in a system for heating, cooling and preventing the formation of condensation on the windshields of automobiles.

The principal object of the present invention is to provide a system which can be easily controlled and which will form a permanent fixture of the automobile.

Another important object of the invention is to provide a system of the character stated which can be employed during the summer time to permit cooling and air conditioning of the vehicle inside and in the winter time converted into a heating system for adequately heating the interior of the vehicle.

Other important objects and advantages of the invention will become apparent to the reader of the following specification.

In the drawings:

Figure 1 represents a longitudinal sectional view through an automobile showing the invention installed.

Figure 2 represents a top plan view of the system shown diagrammatically and in proper relation to the structure of an automobile which is shown in broken lines.

Figure 3 represents a fragmentary front elevational view of the cooler outlet.

Figure 4 represents a vertical sectional view taken substantially on the line 5—5 of Figure 3.

Figure 5 represents a sectional view taken substantially on line 7—7 of Figure 1.

Referring to the drawings by reference numerals, it can be seen, in Figure 1 that numeral 5 generally refers to a conventional automobile body with the exception of the two pane windshield generally referred to by numeral 6 made up of the outside pane 7 and the inside pane 8 submounted in spaced relation to each other and to form a compartment vertically through which extends the partition 9 dividing the space into the chambers a—b.

Numeral 10 represents the internal combustion engine of the vehicle as shown in Figure 1, and numeral 11 represents the usual exhaust manifold.

Numeral 12 represents a shell pivoted at one side to conform to the curvature of the exhaust manifold and suitably clamped thereto. The broad end of this shell 12 is provided with a funnel shaped inlet 14 while the rear end is provided with a tubular extension 15 from which the pipe 16 extends to connect to the compartment between the windshield 6. A control valve 19 is provided in the pipe 16 just below the bearing pipes 17 so that the flow of hot air upwardly from the shell extension 15 can be stopped when desired.

Numeral 20 represents the exhaust pipe which extends from the manifold 11 downwardly and rearwardly under the floor 21 of the vehicle to end at the rear of the vehicle.

Numeral 22 represents a pipe extending downwardly from the shell extension 15 and this is of the cross sectional shape shown in Figure 7, preferably curved on its bottom side to conform with the curvature of the exhaust pipe. Suitable clamp means 23 is employed for securing this pipe 22 against the exhaust pipe 20. This pipe 22 connects to the floor register 24 located in the floor 21 of the vehicle. Another hot air register is generally referred to numeral 25 and is located at the rear end of the shell extension 15.

Figures 4 and 5 show the ventilating outlet for cold air which consists of a box-shaped structure which in cross section tapers upwardly, the same being denoted by numeral 26. The front inclined wall of this box-shaped structure 26 is covered by the screen 27 and has a pair of hingedly connected doors 28—28 which can be opened to any extent desired to permit a regulated volume of cool air to enter the vehicle. A conduit 29 extending from the box 26 branches off to the branch pipes 30—30 and extends forwardly at each side of the car to terminate in a funnel-like inlet 31 at the front of the car, outside of the hood.

Obviously, when desired, hot air can issue from the registers 24—25 and of course by opening the doors 28 on the ventilating box 26 cool air can be brought into the car for the purpose of ventilation.

Admission of hot air to the space between the panes of the windshield prevents condensation on the windshield.

It is desirable that a shutter or some other form of control be installed in the inlet 31 and a rod or other control element extended to a position adjacent the driver's seat so that the inflow of air can be readily controlled.

While the foregoing specification sets forth the invention in specific terms it is to be understood that numerous changes in the shape size and materials may be resorted to without departing from the spirit and scope of the invention as claimed hereinafter.

Having thus described the invention, what is claimed as new is:

A system of ventilating automobiles comprising a pair of elongated branch air conduits for disposition longitudinally along opposite sides of an automobile between the front fenders and the hood thereof, a main conduit located beneath the usual floor of a vehicle, said branch conduits converging inwardly and connected to the said main conduit to communicate therewith, a box like structure mounted within the automobile and connected adjacent its rear wall with the said main conduit to receive air therefrom, said box-like structure having a forwardly and downwardly inclined front wall, a screen in said front wall of the said box like structure, a closure for the box like structure and a shutter at the outer end of each of the said air conduits.

JOSEPH A. SZOSTEK.